Figure 1:
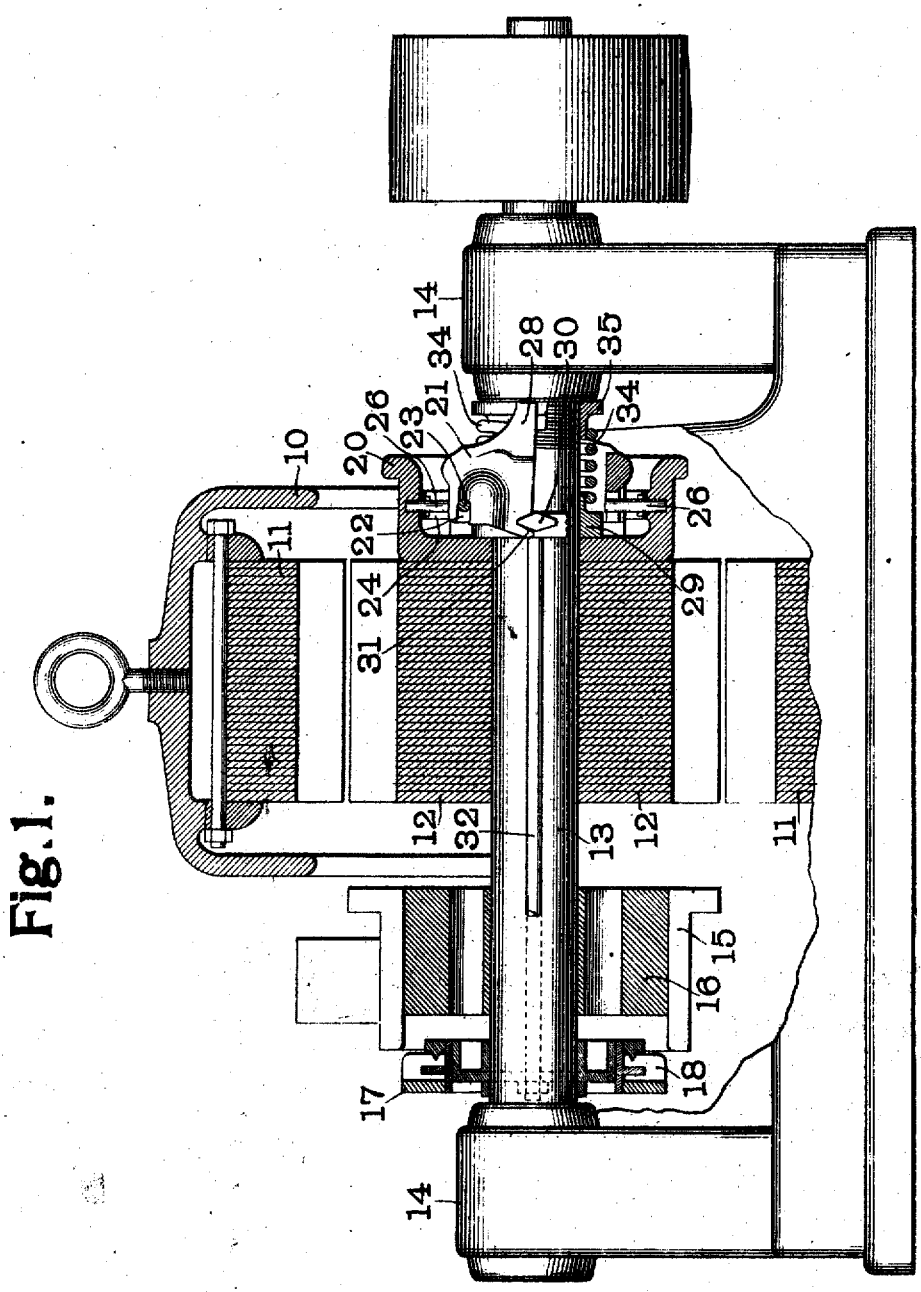

S. SPARROW.
AUTOMATIC CIRCUIT CONTROLLER FOR ELECTRIC MOTORS.
APPLICATION FILED MAY 27, 1909.

1,006,802.

Patented Oct. 24, 1911.
2 SHEETS—SHEET 1.

Witnesses
L. L. Mead.
W. A. Alexander.

Inventor
Simon Sparrow
By his Attorneys
Fowler & Huffman

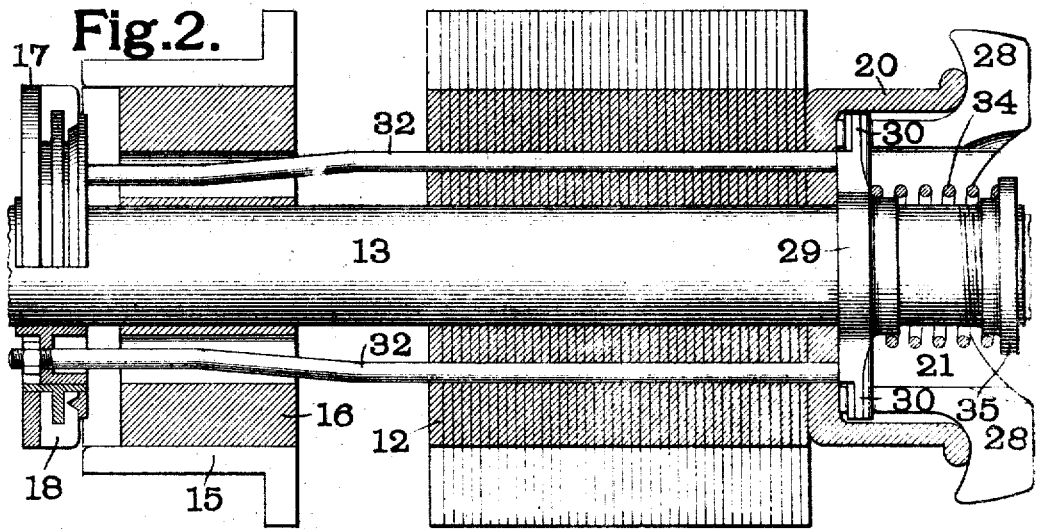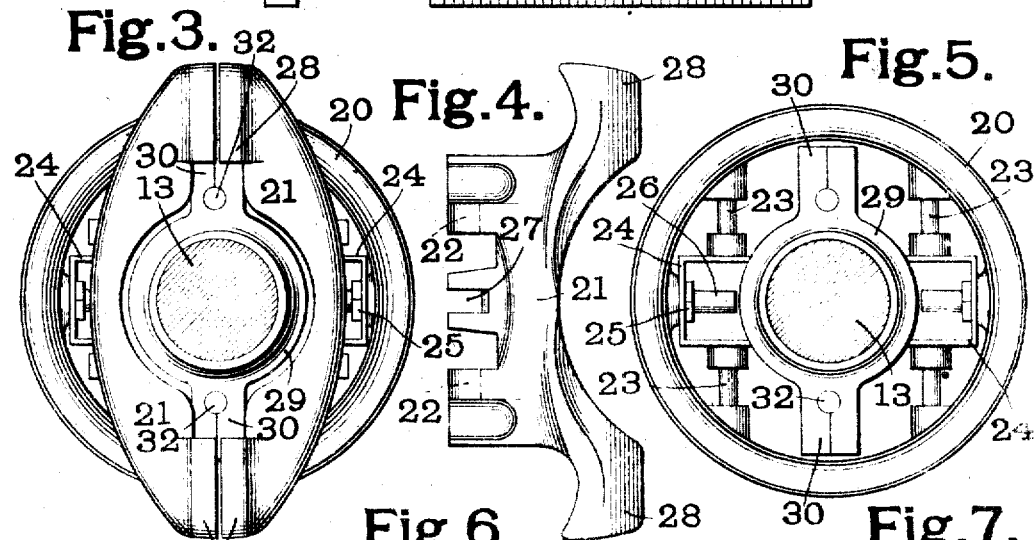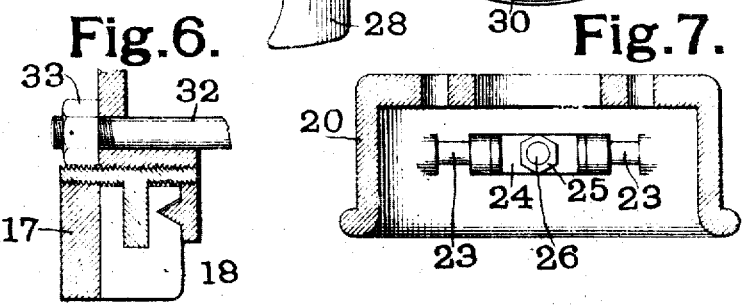

UNITED STATES PATENT OFFICE.

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

AUTOMATIC CIRCUIT-CONTROLLER FOR ELECTRIC MOTORS.

1,006,802.   Specification of Letters Patent.   Patented Oct. 24, 1911.

Application filed May 27, 1909. Serial No. 498,752.

*To all whom it may concern:*

Be it known that I, SIMON SPARROW, a citizen of the United States, residing at the city of St. Louis, in the State of Missouri, have invented a certain new and useful Automatic Circuit-Controller for Electric Motors, of which the following is such a full, clear, and exact description as will enable any one skilled in the art to which it appertains to make and use the same, reference being had to the accompanying drawings, forming part of this specification.

My invention relates to an automatic circuit controller for electric motors and more particularly to a centrifugal governing device for short-circuiting the individual coils of the armature after the motor has reached a predetermined speed.

One object of my invention is to provide a device of the class named which will take up as little room as possible and another object of my invention is to so construct a governor that the short-circuiting member will be moved rapidly both to and from its operative position no matter whether the motor accelerates slowly or rapidly.

In the accompanying drawings, which illustrate one form of circuit controlling device made in accordance with my invention, Figure 1 is a side elevation partly in section showing a motor to which my device is applied. Fig. 2 is a section through the armature and commutator of the motor; Fig. 3 is an end view of the governing device; Fig. 4 is a detailed view of one of the governor weights; Fig. 5 is a view similar to Fig. 3 but showing weights removed; Fig. 6 is an enlarged section through one side of the short circuiting ring and Fig. 7 is a sectional view of the cup shaped member in which the governor weights are pivoted.

Like marks of reference refer to similar parts in the several views of the drawings.

10 is the casing of the motor, 11 the field magnets and 12 the armature. The armature 12 is mounted upon the armature shaft 13 journaled in bearings 14 formed integral with the casing 10. Mounted on the shaft 13 of the armature is the commutator 15 which is connected in the usual manner with the windings of the armature 12.

In order to short-circuit the individual coils of the armature 12 the commutator segments are made to project beyond the core 16 of the commutator as is clearly shown in Fig. 1 of the drawings. An aperture is thus left within the commutator segments so that the various segments may be connected by means of the short-circuiting ring. This short-circuiting ring may be of any usual form, but I prefer to use one like that shown in Fig. 1 of the drawings and in detail in Fig. 6. This short-circuiting device consists of the annular member 17 mounted upon the shaft 13 so as to be capable of longitudinal movement thereon. Mounted in the annular member 17 are a series of contact fingers 18 which are so arranged as to have a slight radial movement so that the centrifugal force generated by the rotation of the armature will cause the said fingers to be forced firmly into contact with the commutator segments 15 when the short-circuiting ring is in position to short-circuit said segments.

Situated at the end of the armature 12 opposite to the commutator 15 is a cup shaped member 20 in which are mounted the governor weights 21. The governor weights 21 are provided with bearing slots 22 (Fig. 4) which take over pins 23 carried in the part 20. These pins 23 are necessarily made separate from the part 20 in order that they may be properly machined. They are held in position by means of U-shaped spring members 24 which bear upon their heads and are held in position by means of nuts 25 on guide pins 26. These guide pins 26 engage with guiding slots 27 formed in the weights 21 and thus prevent lateral movement of the weights. The weights 21 are made wing shaped and embrace the shaft 13 as best shown in Fig. 3 of the drawings. The ends 28 of the weights 21 project beyond the cup shaped member 20 and are made heavier than the remaining part of the weights so that the centers of gyration of the weights lie as nearly as is practicable in the axis of the shaft 13.

In order to communicate the movement of the weights 21 to the short-circuiting ring 17 annular member 29 is provided within the cup 20. This annular member 29 is provided with teeth 30 which engage with notches 31 formed in the weights 21 as best shown in Fig. 1 of the drawings. The engaging surfaces of the teeth 30 and notches 31 should be true odontoids so that the weights 21 will act substantially as pinion wheels and the ring 29 as a rack so that only rolling contact will be had between the two parts and consequently the friction will be reduced to a minimum.

In order to communicate the movement of the ring 29 to the short-circuiting ring 17 a pair of rods 32 pass through openings in the armature 12 and commutator core 16 and are secured to the said short-circuiting ring 17 by means of nuts 33. The movement of the governor weights 20 is opposed by means of a coil spring 34 surrounding the shaft 13 and bearing upon the annular member 29. A threaded member 35 is provided by means of which the tension of the spring 34 may be regulated.

In my governing mechanism the governor weights are in unstable equilibrium in all positions between the open and closed positions and consequently the weights will only remain in their open or closed position no matter what the speed of the armature. This is attained by so locating the centers of gyration of the governor weights that the ratio of increase of the radius of gyration due to the movement of the governor weights around their support is much greater than the ratio of increase of strength of the spring opposing said weights. This not only insures the rapid movement of the short-circuiting member but also insures that the short-circuiting member will not be moved back into its initial position until the speed of the armature has dropped considerably below that which is required to operate the device to short-circuit the armature. In addition to this centrifugal weights are arranged around the shaft in the smallest possible space and consequently the other parts of the motor are not interfered with.

Having fully described my invention, what I claim as new and desire to secure by Letters Patent of the United States is:

1. In a governor, the combination with a rotating shaft, of a pair of wing shaped weights surrounding said shaft and pivoted at the side thereof, and a longitudinally movable member provided with teeth arranged at the side of the shaft and engaging with said weights.

2. In a governor, the combination with a rotating shaft, of a pair of pivoted weights surrounding said shaft and having their greatest weight at their ends, and a longitudinally movable member provided with a pair of teeth situated at the sides of the shaft and midway between said weights, said teeth being engaged by said weights.

3. In a governor, the combination with a revolving shaft, of a cup shaped receptacle surrounding said shaft, a pair of wing shaped weights in said receptacle but having their ends projecting radially beyond the same, and a short circuiting device operated from said weights.

4. In a governor, the combination with a revolving shaft, of a cup shaped receptacle surrounding said shaft, a pair of wing shaped weights pivoted in said receptacle but having their ends projecting radially beyond the same, and a longitudinally movable member located in said receptacle and provided with teeth engaging said weights.

5. In a governor, the combination with a revolving shaft, of a support, removable pivot pins carried by said support, retaining means for said pivot pins, governor weights arranged to turn on said pins, and guiding means acting directly on said weights to prevent the lateral movement of said weights.

6. In a governor, the combination with a revolving shaft, of a cup shaped receptacle, removable pivot pins in said receptacle, retaining means for said pivot pins, governor weights arranged to turn on said pins, and guiding means acting directly on said weights to prevent the lateral movement of said weights.

7. In a governor, the combination with a revolving shaft, of a support, removable pivot pins carried by said support, retaining means for said pivot pins, governor weights arranged to turn on said pivot pins, and guide pins at right angles to said pivot pins for preventing the lateral movement of said weights.

8. In a governor, the combination with a revolving shaft, of a cup shaped receptacle, removable pivot pins in said receptacle, retaining means for said pivot pins, governor weights arranged to turn on said pins, and guide pins at right angles to said pivot pins for preventing the lateral movement of said weights.

9. In a governor, the combination with a revolving shaft, of a support, removable pivot pins carried by said support, governor weights arranged to turn on said pins, retaining springs for holding said pins in position, guide pins for holding said weights in position, and retaining means on said guide pins engaging said springs.

10. In a governor, the combination with a revolving shaft, of a cup shaped receptacle, removable pivot pins in said receptacle, governor weights arranged to turn on said pins, retaining springs for holding said pins in position, guide pins for holding said weights in position, and retaining means on said guide pins engaging said springs.

11. In a governor, the combination with a revolving shaft, of a cup shaped receptacle removable pivot pins in said receptacle, governor weights arranged to turn on said pins, U-shaped retaining springs for holding said pins in position, guide pins at right angles to said pivot pins for holding said weights in position, and nuts on said guide pins engaging said springs.

In testimony whereof I have hereunto set my hand and affixed my seal in the presence of the two subscribing witnesses.

SIMON SPARROW. [L. S.]

Witnesses:
C. B. BENNETT,
M. L. FRANKLIN.